May 14, 1963 G. A. CUTSOGEORGE 3,089,337
LIQUID LEVEL INDICATING SYSTEM
Filed June 23, 1961 2 Sheets-Sheet 1

INVENTOR
GEORGE A. CUTSOGEORGE
BY
J. William Carson
ATTORNEY

May 14, 1963  G. A. CUTSOGEORGE  3,089,337
LIQUID LEVEL INDICATING SYSTEM
Filed June 23, 1961  2 Sheets-Sheet 2

INVENTOR
GEORGE A. CUTSOGEORGE
BY
J. William Carson
ATTORNEY

United States Patent Office 3,089,337
Patented May 14, 1963

3,089,337
LIQUID LEVEL INDICATING SYSTEM
George A. Cutsogeorge, Cranford, N.J., assignor to Specialties Development Corporation, Belleville, N.J., a corporation of New Jersey
Filed June 23, 1961, Ser. No. 119,121
3 Claims. (Cl. 73—295)

The present invention relates to indicating systems, and, more particularly, to systems for indicating the level of a liquid in a container.

An object of the present invention is to provide a novel and improved system for indicating the level of a liquid, which system operates on thermal principles.

Another object is to provide such a system wherein the heat conducting properties of the liquid are utilized to control the transfer of electrical energy between electrical input and output components.

Another object is to utilize, in a liquid level indicating system, the known effect of heat on magnetic materials to cause changes in the permeabilities thereof, this effect being commonly referred to as the Curie effect.

Another object is to utilize, in a liquid level indicating system, the known effect of heat to cause a magnetic material to lose its magnetic properties at a predetermined temperature, normally referred to as the Curie point of the material.

A further object is to provide a liquid level indicating system which is relatively insensitive to transient level variations due to horizontal movement of the liquid.

Other and further objects of the invention will be obvious upon an understanding of the illustrative embodiment about to be described, or will be indicated in the appended claims, and various advantages not referred to herein will occur to one skilled in the art upon employment of the invention is practice.

In accordance with the present invention, the foregoing objects are accomplished by providing a system comprising a coil adapted to be inserted in a receptacle containing a liquid, means for supplying a current to the coil, a body of magnetic material positioned within the magnetic field of the coil, means for supplying heat to the body in sufficient quantity to maintain it above its Curie point in the presence of gaseous medium above the liquid level and below its Curie point in the presence of liquid, and means for determining the effect of said body upon the magnetic field of said coil.

Preferred embodiments of the invention have been chosen for purposes of illustration and description, and are shown in the accompanying drawings, forming a part of the specification, wherein.

Figure 1:
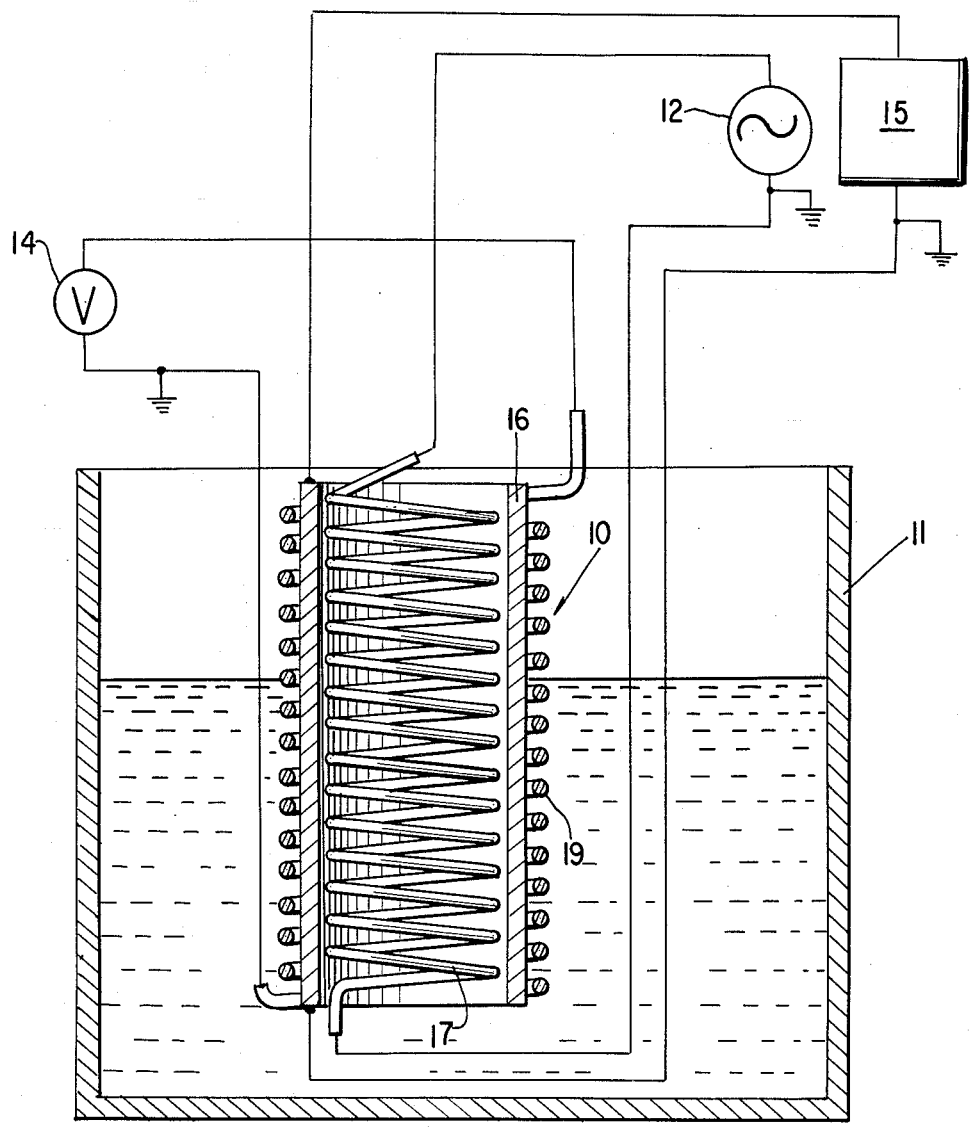
FIG. 1 is a diagrammatic view of a liquid level indicating system illustrating a probe in longitudinal section.

Referring to FIG. 1 of the drawings in detail, there is shown a liquid level indicating system in accordance with the present invention which comprises a probe 10 to be inserted in a container 11 containing a liquid the level of which is to be monitored, a source of alternating current 12 for exciting the probe 10, an alternating current voltmeter 14, and a source of current 15 for heating a portion of the probe.

The probe 10 includes a tubular body 16 of magnetic material vertically positioned within the container 11 to have its longitudinal axis perpendicular to the normal free surface of the liquid, an input coil 17 positioned concentrically within the body 16, and an output coil 19 wound around the body 16. The coil 17 is connected to the supply of alternating current 12 and the coil 19 is connected to the voltmeter 14 to measure the voltage induced therein by magnetic coupling with the coil 17.

The body 16 is connected to the electrical supply 15 and is heated by the flow of current therefrom to a degree sufficient to maintain the entire body above its Curie point temperature when it is completely encompassed by a gaseous medium such as the air space above the liquid or the liquid in its gaseous phase. Under these conditions the body 16 loses its magnetic properties and energy is transferred freely from the coil 17 to the coil 19.

The amount of heat supplied to the body 16 is such that when liquid at ambient temperature is placed in contact therewith, a portion of the body is cooled, through heat transfer to the liquid, to a temperature below the Curie point temperature. The portion of the body so cooled regains its magnetic properties and provides a partial magnetic shield between the coils 17 and 19 thus reducing the energy transferred to the coil 19. Thus, the energy induced in the coil 19, and the reading of the voltmeter 14, decreases as the level of the liquid in the container 11 increases.

The voltmeter 14 is preferably calibrated to give a direct reading of the level or the volume of the fluid in the container 11. Also, one side of each of the source 12, the voltmeter 14, and the source 15 is grounded to prevent capacitive coupling between the coils 17 and 19 so that energy can be transferred to the coil 19 only by the magnetic coupling between the coils.

It will be appreciated that a finite increment of time is required for the heat level in any portion of the body 16 to change sufficiently to affect the reading of the voltmeter 14. This system, therefore, is less subject to the effects of sloshing of the liquid monitored than previously known systems.

Preferably, the body 16 is formed of a material which has a relatively low Curie point and is characterized by a sharp change in permeability at its Curie point. An example of such a material is an alloy composed of about 31.35% nickel, about 11.80% chromium, and about 56.85% iron by weight which has a Curie point of 295° F., which is known as Midvale E. I. 562.

A body 16 formed of such an alloy, if supplied with sufficient heat to raise its temperature to about 350° F. in a completely gaseous environment, would, upon partial immersion in a liquid, transfer sufficient heat to the liquid to cool that portion of the body below its Curie point and cause the reading of the voltmeter 14 to vary by an amount dependent upon the percentage of the tube so cooled.

Figure 2:
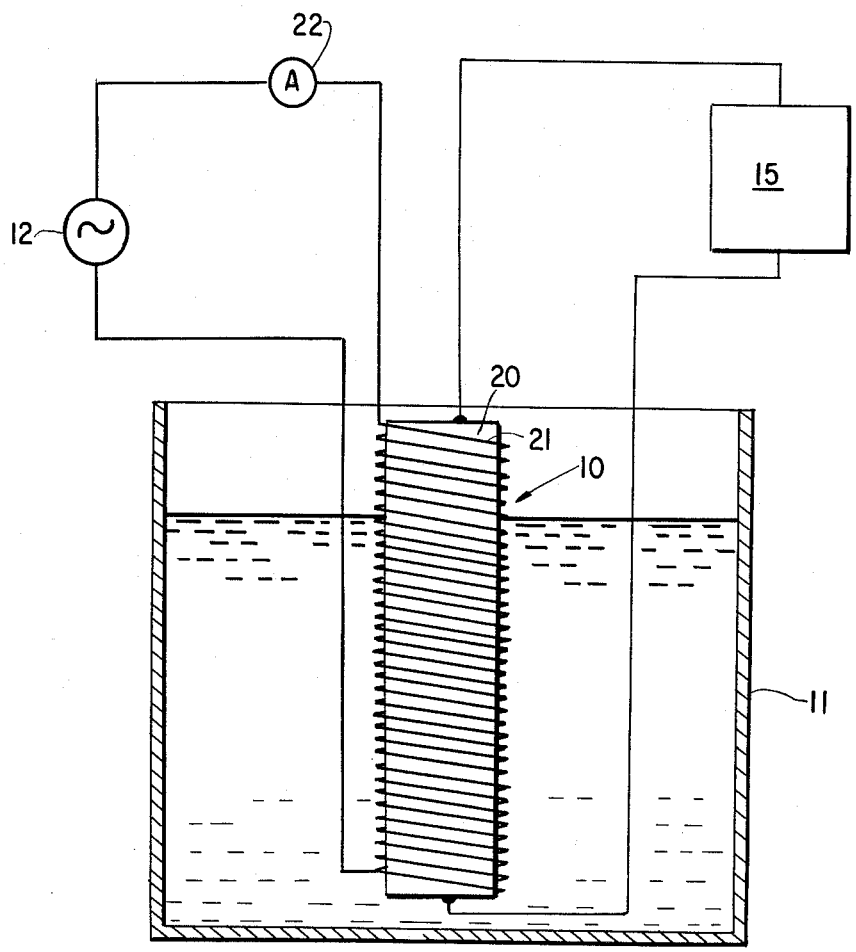
FIG. 2 is a diagrammatic sectional view of a modified liquid level indicating system utilizing a probe of simpler construction.

In FIG. 2 there is shown a modified system wherein the probe 10 inserted in the container 11 includes a rod 20 of magnetic material and a coil 21 wound on the rod 20. The coil 21 is connected in series with the alternating current source 12 and an alternating current milliammeter 22, and the rod 20 is connected to the electrical supply 15 to be heated by the flow of current therefrom to a degree sufficient to maintain the entire rod above its Curie point temperature when it is completely surrounded by a gaseous medium.

The impedance of the coil 21 to the flow of alternating current from the source 12 is dependent upon the effect of the rod 20 upon the magnetic field of the coil 21. When the rod is heated above its Curie point temperature, it loses its magnetic properties and has no effect upon the magnetic field of the coil 21, however, when a portion of the rod is cooled below its Curie point temperature, that portion of the rod regains its magnetic properties and concentrates the magnetic field about the coil to increase its inductance and hence its impedance to the flow of alternating current. Thus, the impedance of the coil increases with increases in the length of the portion of the rod having magnetic properties, therefore, the current flowing through the coil 21, as indicated by the milliammeter 22, varies inversely with the level of the liquid in the container 11. The meter 22 is preferably calibrated to give a direct reading of the level or the volume of the fluid in the container 11.

The systems described in connection with FIGS. 1 and 2 can be utilized for detecting and indicating the liquid level of a wide variety of materials, for example, water, alcohols, gasoline and the like.

From the foregoing description, it can be seen that the present invention provides a novel and improved system for indicating the level of a liquid in a container wherein the heat conducting properties of the element material and the Curie effect on magnetic materials are used to control the transfer of electrical energy between electrical input and output components.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A liquid level indicating system comprising a coil adapted to be inserted in a liquid within a container, means for supplying a current to said coil, a body of magnetic material positioned within the magnetic field of said coil, means for supplying sufficient heat to said body to maintain it above its Curie point in the presence of gaseous medium above the liquid level and below its Curie point in the presence of the liquid, and means for determining the effect of said body upon the magnetic field of said coil.

2. Apparatus according to claim 1, wherein said effect determining means includes a meter interconnected with said current supplying means and said coil.

3. A liquid level indicating system comprising a coil adapted to be inserted in a liquid within a container, a second coil adjacent said first coil, means for supplying a periodically varying current to said first coil, means for measuring the signal developed in said second coil, a body of magnetic material positioned between said coils normally providing magnetic shielding between said coils, and means for supplying sufficient heat to said body to maintain it above its Curie point in the presence of gaseous medium above the liquid level and below its Curie point in the presence of the liquid.

References Cited in the file of this patent

UNITED STATES PATENTS

| | | |
|---|---|---|
| 1,996,823 | Osnos | Apr. 9, 1935 |
| 2,456,617 | Burch | Dec. 21, 1948 |
| 2,926,343 | Postal | Feb. 23, 1960 |
| 2,978,691 | Beher | Apr. 4, 1961 |